(12) United States Patent
Lee et al.

(10) Patent No.: US 11,264,675 B2
(45) Date of Patent: Mar. 1, 2022

(54) INK COMPOSITION FOR SECONDARY BATTERY SEPARATION FILM, AND SECONDARY BATTERY SEPARATION FILM INCLUDING SAME

(71) Applicant: LG CHEM, LTD., Seoul (KR)

(72) Inventors: Kun Seok Lee, Daejeon (KR); Jungyeon Lee, Daejeon (KR); Seung Heon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 91 days.

(21) Appl. No.: 16/312,183

(22) PCT Filed: Aug. 11, 2017

(86) PCT No.: PCT/KR2017/008767
§ 371 (c)(1),
(2) Date: Dec. 20, 2018

(87) PCT Pub. No.: WO2018/030850
PCT Pub. Date: Feb. 15, 2018

(65) Prior Publication Data
US 2019/0252659 A1   Aug. 15, 2019

(30) Foreign Application Priority Data

Aug. 12, 2016  (KR) .................. 10-2016-0103132

(51) Int. Cl.
| | |
|---|---|
| H01M 50/446 | (2021.01) |
| H01M 50/403 | (2021.01) |
| H01M 50/449 | (2021.01) |
| H01M 10/058 | (2010.01) |

(52) U.S. Cl.
CPC ....... *H01M 50/446* (2021.01); *H01M 10/058* (2013.01); *H01M 50/403* (2021.01); *H01M 50/449* (2021.01)

(58) Field of Classification Search
CPC .. H01M 2/1686; H01M 2/166; H01M 2/1666; H01M 50/461
See application file for complete search history.

(56) References Cited

U.S. PATENT DOCUMENTS

| | | | |
|---|---|---|---|
| 6,306,545 B1 * | 10/2001 | Carlson ................ | B01D 71/025 429/247 |
| 9,786,891 B2 | 10/2017 | Choi et al. | |
| 10,522,809 B2 | 12/2019 | Ogata et al. | |
| 2005/0221165 A1 | 10/2005 | Hennige et al. | |
| 2009/0152509 A1 | 6/2009 | Choi et al. | |
| 2012/0196191 A1 | 8/2012 | Jeon et al. | |
| 2013/0302661 A1 * | 11/2013 | Kim ................... | H01M 50/449 429/144 |
| 2013/0316219 A1 | 11/2013 | Ha et al. | |
| 2014/0302373 A1 | 10/2014 | Lockett et al. | |

(Continued)

FOREIGN PATENT DOCUMENTS

| | | |
|---|---|---|
| CN | 103238249 | 8/2013 |
| CN | 103814459 | 5/2014 |

(Continued)

*Primary Examiner* — Nathanael T Zemui
(74) *Attorney, Agent, or Firm* — Dentons US LLP

(57) ABSTRACT

The present application relates to an ink composition for a secondary battery separator, a separator for a secondary battery including the same, and a method for preparing the same.

12 Claims, 2 Drawing Sheets

(56) References Cited

U.S. PATENT DOCUMENTS

| | | | |
|---|---|---|---|
| 2015/0171393 A1* | 6/2015 | Ogata | B32B 37/18 |
| | | | 429/246 |
| 2015/0303427 A1* | 10/2015 | Hyun | H01M 10/052 |
| | | | 429/145 |
| 2015/0340730 A1* | 11/2015 | Kim | H01M 4/525 |
| | | | 429/94 |
| 2016/0028064 A1 | 1/2016 | Choi et al. | |
| 2016/0164059 A1* | 6/2016 | Hong | H01M 10/052 |
| | | | 429/144 |
| 2016/0340527 A1 | 11/2016 | Son et al. | |
| 2016/0344009 A1 | 11/2016 | Suzuki et al. | |
| 2017/0309883 A1* | 10/2017 | Mizuno | B32B 27/08 |
| 2017/0327662 A1* | 11/2017 | Yoneyama | H01M 50/409 |
| 2019/0237735 A1 | 8/2019 | Suzuki et al. | |
| 2020/0067053 A1 | 2/2020 | Cheng et al. | |

FOREIGN PATENT DOCUMENTS

| | | |
|---|---|---|
| CN | 104508898 | 4/2015 |
| CN | 104600240 | 5/2015 |
| CN | 104956518 | 9/2015 |
| CN | 105742551 | 7/2016 |
| JP | 2014194928 | 10/2014 |
| JP | 2016535401 | 11/2016 |
| KR | 10-2007-0087852 | 8/2007 |
| KR | 10-0776133 | 11/2007 |
| KR | 10-0877161 | 12/2008 |
| KR | 10-2009-0066022 | 6/2009 |
| KR | 10-2010-0025895 | 3/2010 |
| KR | 10-0979084 | 8/2010 |
| KR | 10-2012-0087028 | 8/2012 |
| KR | 10-2015-0048082 | 5/2015 |
| KR | 10-2015-0064438 | 6/2015 |
| KR | 10-2015-0105254 | 9/2015 |
| KR | 10-2016-0042662 | 4/2016 |
| KR | 10-2016-0051664 | 5/2016 |
| KR | 10-2016-0057345 | 5/2016 |
| WO | 2014014118 | 1/2014 |
| WO | 2015065118 | 5/2015 |
| WO | 2015/111230 | 7/2015 |

* cited by examiner

[FIG. 1]
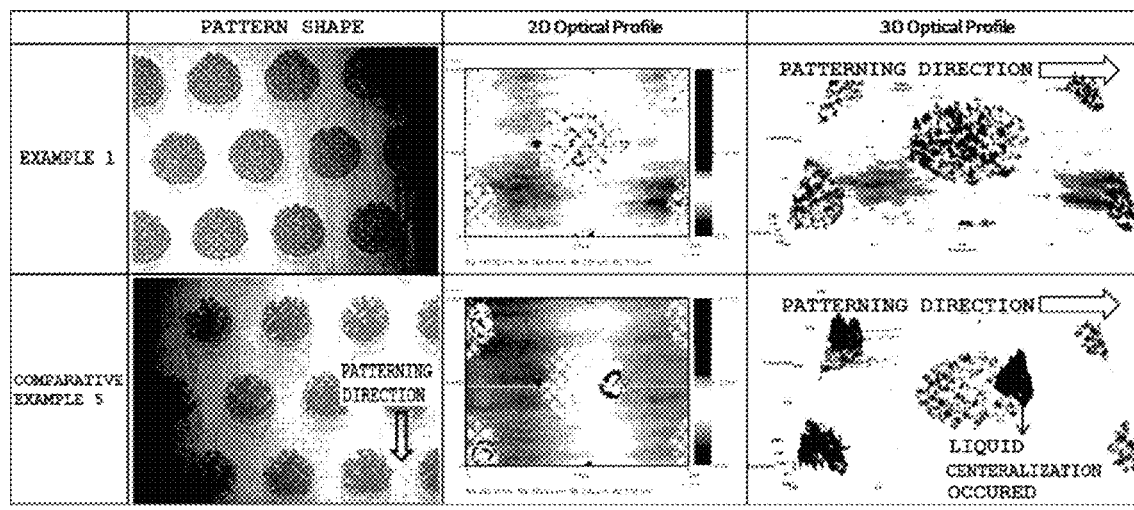
[FIG. 2]
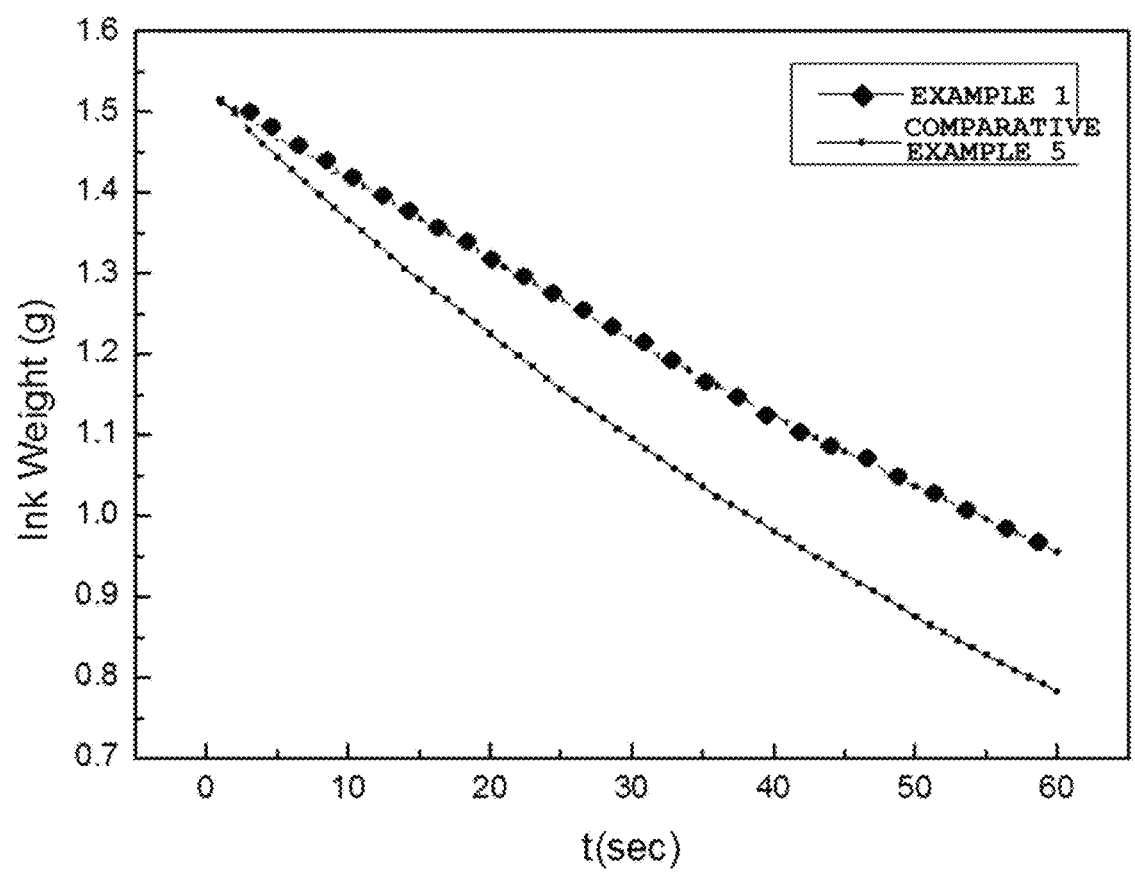

[FIG. 3]
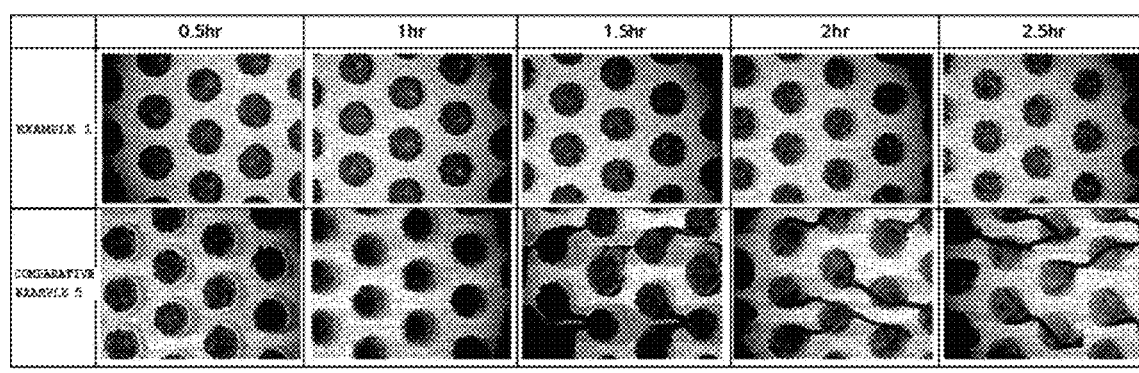
[FIG. 4]
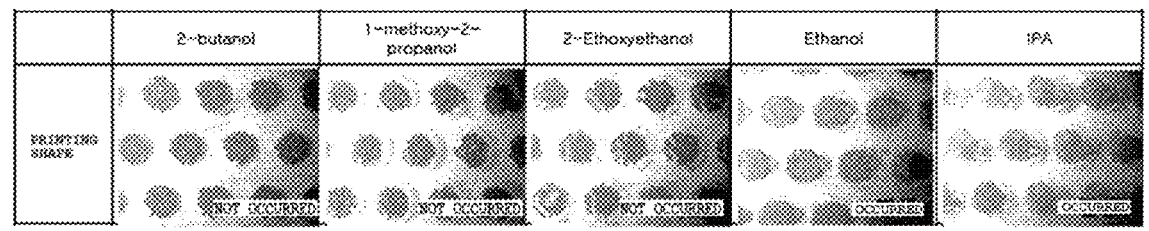

INK COMPOSITION FOR SECONDARY BATTERY SEPARATION FILM, AND SECONDARY BATTERY SEPARATION FILM INCLUDING SAME

CROSS-REFERENCE TO RELATED APPLICATION

This application is a National Stage Application of International Application No. PCT/KR2017/008767 filed on Aug. 11, 2017, which claims priority to and the benefits of Korean Patent Application No. 10-2016-0103132, filed with the Korean Intellectual Property Office on Aug. 12, 2016, the entire contents of which are incorporated herein by reference.

TECHNICAL FIELD

The present application relates to an ink composition for a secondary battery separator and a separator for a secondary battery including the same.

BACKGROUND ART

Secondary batteries that have been much used recently have double sidedness of convenience and dangerousness. Particularly, in a lithium secondary battery, excessive lithium comes out from a positive electrode when the lithium secondary battery is overcharged, and as the lithium is inserted to a negative electrode, lithium metal having very high reactivity is precipitated on a surface of the negative electrode, and the positive electrode also becomes thermally unstable causing a safety problem such as battery ignition or explosion due to a sudden exothermic reaction caused by a decomposition reaction of an organic solvent used as a liquid electrolyte.

When such heat generation occurs, a separator is contracted causing a direct short circuit of the positive electrode and the negative electrode again, and as short circuit sections increase due to repeated heat generation and separator contraction, thermal runaway occurs, or the positive electrode, the negative electrode and the liquid electrolyte forming the inside of a battery react with each other or are burned, and since such a reaction is a quite considerable exothermic reaction, battery ignition or explosion resultantly occurs. Particularly, such dangerousness becomes more important as energy density increases as lithium secondary batteries become to have high capacity.

In order to resolve such problems and enhance safety during overcharge, there has been an attempt to use a safe separator with enhanced safety by applying an aqueous emulsion ink including an adhesive binder on a porous film, however, emulsion particles are not uniformly dispersed when applying the emulsion ink on the porous film, and therefore, the emulsion ink is not smoothly coated, and controlling and maintaining viscosity is difficult in process of time, which resultantly causes a problem of declining performance of the safe separator.

In addition, a printing method may be used instead of a coating method to uniformly applying an emulsion ink, and in this case, particle dispersibility is inhibited due to a solvent added for improving emulsion transferability, and binder particle precipitation occurs at the bottom inside an ink storing place when printing for a long period of time leading to a problem of causing nonuniformity of printed matters by generating overall solid flowering of the solution.

Accordingly, development of an ink composition capable of printing that secures pattern thickness uniformity while preventing dispersibility inhibition has been urgently required.

DISCLOSURE

Technical Problem

The present application is directed to providing an ink composition for a secondary battery separator, and a separator for a secondary battery including the same.

Technical Solution

One embodiment of the present application provides an ink composition for a secondary battery separator including a binder, water, a first solvent and a second solvent, wherein the first solvent has surface energy of 30 mN/m or less at 20° C., the second solvent has a vapor pressure of 2 kPa or less at 20° C., and the first solvent and the second solvent are different from each other.

Another embodiment of the present application provides a separator for a secondary battery including a porous base; and a coating solution applied on the porous base, wherein the coating solution is formed using the ink composition according to one embodiment of the present application.

Still another embodiment of the present application provides a method for preparing a separator for a secondary battery including preparing a porous base; and printing a coating solution on the porous base, wherein the coating solution is formed using the ink composition according to one embodiment of the present application.

Advantageous Effects

An ink composition for a secondary battery separator according to one embodiment of the present application can be uniformly applied on a base in a printing process.

In addition, an ink composition for a secondary battery separator according to one embodiment of the present application prevents pattern spreading while obtaining high transferability, and a uniform printed matter can be prepared.

DESCRIPTION OF DRAWINGS

FIG. 1 presents pictures showing experimental results for identifying a pattern shape and occurrences of liquid centralization of an ink composition according to one embodiment of the present application.

FIG. 2 presents pictures showing experimental results for identifying an evaporating rate of an ink composition according to one embodiment of the present application.

FIG. 3 presents pictures showing experimental results for identifying a pattern spreading phenomenon depending on a printing time of an ink composition according to one embodiment of the present application.

FIG. 4 presents pictures showing experimental results for identifying a pattern spreading phenomenon depending on a solvent type of an ink composition according to one embodiment of the present application.

MODE FOR DISCLOSURE

Hereinafter, the present specification will be described in more detail.

One embodiment of the present application provides an ink composition for a secondary battery separator including a binder, water, a first solvent and a second solvent, wherein the first solvent has surface energy of 30 mN/m or less at 20° C., the second solvent has a vapor pressure of 2 kPa or less at 20° C., and the first solvent and the second solvent are different from each other.

The first solvent corresponds to a solvent having low surface energy, and the first solvent may have surface energy of 30 mN/m or less at 20° C., and more specifically, 25 mN/m or less at 20° C. In addition, minimum surface energy may be 10 mN/m at 20° C. When using a solvent corresponding to such a numerical range as the first solvent, transferability for the base may be 50% or greater.

As a method of measuring the surface energy, any method may be used regardless of the type as long as it is a common surface energy measuring method, however, the surface energy may be measured using a lubricating method of horizontally touching a platinum ring on a liquid surface, then pulling up the platinum ring motionlessly, and measuring a force forming a balance with surface tension applied on the ring at the moment of the ring coming off from the liquid surface using a scale.

According to one embodiment of the present specification, the type of the first solvent is not particularly limited as long as it is a solvent corresponding to the range of the above-mentioned surface energy value, and may be at least one selected from the group consisting of ethanol, isopropyl alcohol, 2-butanol, 1-methoxy-2-propanol and 2-ethoxyethanol.

Particularly, transferability of 90% or greater for the base may be obtained when using ethanol, isopropyl alcohol and 2-butanol.

In addition, the second solvent corresponds to a solvent having a low vapor pressure, and the second solvent may have a vapor pressure of 2 kPa or less at 20° C. In addition, the minimum vapor pressure may be 0.2 kPa. Using a solvent corresponding to such a numerical range may prevent pattern spreading.

As for the vapor pressure value, values commonly known in single solvents may be used.

According to one embodiment of the present specification, the type of the second solvent is not particularly limited as long as it is a solvent corresponding to the range of the above-mentioned vapor pressure value, and may be at least one selected from the group consisting of 2-butanol, 1-methoxy-2-propanol and 2-ethoxyethanol.

According to one embodiment of the present specification, the ink composition may include the binder in 1 parts by weight to 20 parts by weight, the water in 5 parts by weight to 60 parts by weight, the first solvent in 5 parts by weight to 80 parts by weight, and the second solvent in 5 parts by weight to 50 parts by weight based on a total of 100 parts by weight. When using a constitution of the above-mentioned numerical range, transferability and a liquid centralization preventing effect to obtain through the present disclosure may be obtained.

According to one embodiment of the present specification, the binder is prepared in an emulsion form, and the emulsion may have a particle diameter of 100 nm to 1000 nm. Emulsion particles are commonly formed in a globular form, and the particle diameter may mean a diameter of the globular form. The method of obtaining a diameter of the emulsion particle is not particularly limited, however, the diameter may be obtained using a SEM and a laser particle size analyzer. When the emulsion particle size is in the above-mentioned range, dispersion stability of the binder may be obtained, and accordingly, target transferability and liquid centralization preventing effect may be obtained.

The type of the binder is not particularly limited, and may be any one selected from the group consisting of polyvinylidene fluoride, polyacrylate, an acryl-based copolymer, polyvinyl alcohol, carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated EPDM, styrene-butadiene rubber, fluororubber, acrylic rubber and mixtures thereof.

In addition, one embodiment of the present specification provides a separator for a secondary battery including a porous base; and a coating solution applied on the porous base, wherein the coating solution is formed using the ink composition according to one embodiment of the present application.

In addition, one embodiment of the present specification provides a method for preparing a separator for a secondary battery including preparing a porous base; and printing a coating solution on the porous base, wherein the coating solution is formed using the ink composition according to one embodiment of the present application.

The printing is not particularly limited, but may be carried out using gravure printing. An adhesive layer being applied on the whole surface functions as resistance in cation ion transfer, and this considerably functions as battery resistance, and therefore, battery resistance may be minimized therethrough by partially forming an adhesive layer through pattern printing using gravure printing.

In addition, according to one embodiment of the present specification, inorganic particles may be further included on the surface of the porous base.

The porous base may be a polyolefin-based separator commonly used in the art, and is not particularly limited in the type, but may be a sheet formed with any one selected from the group consisting of high density polyethylene, low density polyethylene, linear low density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and mixtures thereof.

A pore size and porosity of the porous base are not particularly limited, however, the porosity may be in a range of 10% to 95%, and the pore size (diameter) may be from 0.1 μm to 50 μm. When the pore size and the porosity are less than 0.1 μm and 10%, respectively, the porous base functions as a resistive layer, and when the pore size and the porosity are greater than 50 μm and 95%, respectively, mechanical properties may be difficult to maintain.

The coating solution according to one embodiment of the present application may refer to a chemical mixture having a depolarization function or a conducting function while being present between positive electrode and negative electrode containers of a battery. In addition, the coating solution may be formed using the ink composition according to one embodiment of the present application.

In addition, the inorganic particles that may be prepared on the surface of the porous base have ionic properties on the surface, and therefore, chemical adsorption may be obtained through an interaction by ionic components in a relation with a dispersant according to one embodiment of the present application, and dispersibility may be maintained by the inorganic particle-adsorbed dispersant being uniformly mixed with an aqueous solvent.

The type of the inorganic particles is not particularly limited, but may be any one selected from the group consisting of $BaTiO_3$, $Pb(Zr,Ti)O_3$ (PZT), $Pb_{1-x}La_xZr_{1-y}Ti_yO_3$ (PLZT) (0<x<1, 0<y<1), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $Ti_2O$, SiC, $(LiAlTiP)_xO_y$-based glass (0<x<4, 0<y<13), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4), $P_2S_5$-based glass ($Li_xP_yS_z$, 0<x<3, 0<y<3, 0<z<7) and mixtures thereof.

In addition, one embodiment of the present specification provides a method for preparing a separator for a secondary battery including preparing a porous base; and printing a coating solution on the porous base, wherein the coating solution is formed using the ink composition according to one embodiment of the present application.

In addition, according to one embodiment of the present specification, inorganic particles may be further included on the surface of the porous base.

The method of applying the coating solution on the porous base according to one embodiment of the present application is through printing, which corresponds to a method different from coating. When applying a coating solution on a porous base by coating, particles are not uniformly dispersed, and coating of a coating solution in a mixture form is not smooth making viscosity control and maintaining difficult in process of time, which may decline separator performance. Accordingly, through a method of printing instead of coating, a separator for a secondary battery may be prepared while maintaining uniform dispersibility for a long period of time.

In addition, the method of printing in the printing according to one embodiment of the present application is not particularly limited, but may be by gravure printing.

As for the porous base and the inorganic particles, descriptions provided above may be used.

In addition, one embodiment of the present application provides an electrode assembly including the separator, a positive electrode and a negative electrode, and provides a lithium secondary battery having the electrode assembly embedded in a battery case with a non-aqueous liquid electrolyte.

The positive electrode is prepared by applying a mixture of a positive electrode active material, a conductor and a binder on a positive electrode current collector, and then drying and pressing the result, and as necessary, a filler may be further added to the mixture.

The positive electrode current collector is generally prepared to have a thickness of 3 μm to 500 μm. Such a positive electrode current collector is not particularly limited as long as it has high conductivity without inducing chemical changes to the corresponding battery, and for example, stainless steel, aluminum, nickel, titanium, baked carbon, or aluminum or stainless steel of which surface is treated with carbon, nickel, titanium, silver or the like, may be used. The current collector may have fine unevenness formed on its surface to increase adhesive strength of the positive electrode active material, and various forms such as films, sheets, foil, nets, porous bodies, foams and non-woven fabrics may be used.

The conductor is commonly added in 1 parts by weight to 30 parts by weight based on the total weight of the mixture including the positive electrode active material.

Such a conductor is not particularly limited as long as it has conductivity without inducing chemical changes to the corresponding battery, and examples thereof may include graphite such as natural graphite or artificial graphite; carbon black such as carbon black, acetylene black, ketjen black, channel black, furnace black, lamp black or thermal black; conductive fibers such as carbon fiber or metal fibers; fluorocarbon, aluminum and metal powders such as nickel powder; conductive whiskers such as zinc oxide or potassium titanate; conductive metal oxides such as titanium oxide; conductive materials such as polyphenylene derivatives, and the like.

The filler is selectively used as a component suppressing expansion of the positive electrode, and is not particularly limited as long as it is a fibrous material and does not induce chemical changes to the corresponding battery. Examples thereof may include olefin-based polymers such as polyethylene or polypropylene; fibrous materials such as glass fiber or carbon fiber.

Meanwhile, the negative electrode is prepared by applying a negative electrode active material on a negative electrode current collector, and drying and pressing the result, and as necessary, may selectively further include a conductor, a binder, a filler and the like as above.

The negative electrode current collector is generally prepared to have a thickness of 3 μm to 500 μm. Such a negative electrode current collector is not particularly limited as long as it has conductivity without inducing chemical changes to the corresponding battery, and for example, copper, stainless steel, aluminum, nickel, titanium, baked carbon, copper or stainless steel of which surface is treated with carbon, nickel, titanium, silver or the like, aluminum-cadmium alloys, or the like may be used. In addition, like the positive electrode current collector, the negative electrode current collector may have fine unevenness formed on its surface to increase adhesive strength of the negative electrode active material, and various forms such as films, sheets, foil, nets, porous bodies, foams and non-woven fabrics may be used.

Examples of the negative electrode active material may include carbon such as hard carbon or graphite-based carbon; metal composite oxides such as $Li_xFe_2O_3$ (0≤x≤1), $Li_xWO_2$ (0≤x≤1) or $Sn_xMe_{1-x}Me'_yO_z$ (Me: Mn, Fe, Pb, Ge; Me': Al, B, P, Si, elements of groups 1, 2 and 3 in the periodic table, halogen; 0<x~1; 1≤y≤3; 1≤z≤8); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials, and the like.

Hereinafter, the present application will be described in more detail with reference to examples according to one embodiment of the present specification, however, the scope of the present disclosure is not limited thereto.

Example 1

An ink composition was prepared including a binder in 10 parts by weight, water in 50 parts by weight, ethanol in 30 parts by weight as a first solvent and 2-butanol in 10 parts by weight as a second solvent.

Example 2

An ink composition was prepared including a binder in 10 parts by weight, water in 50 parts by weight, isopropyl alcohol in 30 parts by weight as a first solvent and 2-butanol in 10 parts by weight as a second solvent.

Example 3

An ink composition was prepared including a binder in 10 parts by weight, water in 50 parts by weight, 2-butanol in 30 parts by weight as a first solvent and 2-butanol in 10 parts by weight as a second solvent. (total of 40 parts by weight of 2-butanol)

Example 4

An ink composition was prepared including a binder in 10 parts by weight, water in 50 parts by weight, ethanol in 30 parts by weight as a first solvent and 1-methoxy-2-propanol in 10 parts by weight as a second solvent.

Example 5

An ink composition was prepared including a binder in 10 parts by weight, water in 50 parts by weight, ethanol in 30 parts by weight as a first solvent and 2-ethoxyethanol in 10 parts by weight as a second solvent.

Comparative Example 1

An ink composition was prepared including a binder in 10 parts by weight, water in 50 parts by weight, 1-methoxy-2-propanol in 30 parts by weight as a first solvent and 2-butanol in 10 parts by weight as a second solvent.

Comparative Example 2

An ink composition was prepared including a binder in 10 parts by weight, water in 50 parts by weight, 2-ethoxyethanol in 30 parts by weight as a first solvent and 2-butanol in 10 parts by weight as a second solvent.

Comparative Example 3

An ink composition was prepared including a binder in 10 parts by weight, water in 50 parts by weight, ethylene glycol in 30 parts by weight as a first solvent and 2-butanol in 10 parts by weight as a second solvent.

Comparative Example 4

An ink composition was prepared including a binder in 10 parts by weight, water in 50 parts by weight, ethanol in 30 parts by weight as a first solvent and ethanol in 10 parts by weight as a second solvent. (total of 40 parts by weight of ethanol)

Comparative Example 5

An ink composition was prepared including a binder in 10 parts by weight, water in 50 parts by weight, ethanol in 30 parts by weight as a first solvent and isopropyl alcohol in 10 parts by weight as a second solvent.

Experimental Example

In order to identify water dispersibility of the aqueous adhesive binder emulsion, the solution mixing the aqueous adhesive emulsion and water, and the solvent were mixed in 1:1, and a precipitation status of the adhesive binder was identified. As a result, it was identified that ethanol, isopropyl alcohol, ethylene glycol, 2-butanol, 2-ethoxyethanol and 1-methoxy-2-propanol were blended without producing precipitation, and MEK, acetone and NMP produced precipitation by the adhesive binder being aggregated with each other. In solvents that are not limited to the above-mentioned solvents, solvents inhibiting water dispersibility of the aqueous adhesive binder emulsion may not be used in the ink.

Through the ink compositions prepared in Examples 1 to 5 and Comparative Examples 1 to 5, experiments on transferability and occurrences of pattern spreading for the base of the pattern were performed.

The ink compositions prepared in Examples 1 to 5 and Comparative Examples 1 to 5 were each printed on a polypropylene separator with a gravure printing method using a printing proofer. Specifically, the printing was progressed by applying the ink on a gravure printing plate, filling the pattern groove part with the ink by removing the ink of the parts except the pattern groove part using a doctor blade, and then rolling a polypropylene separator-winding rubber roller through applying a pressure.

As a result, it was identified that 90% or more of the printing plate pattern was printed in the patterns of Examples 1 to 3. It was identified that, in the patterns of Comparative Examples 1 and 2, greater than or equal to 50% and less than or equal to 90% of the printing plate pattern was printed. It was identified that 50% or less of the printing plate pattern was printed in the pattern of Comparative Example 3.

The results of observation on the pattern shape and the occurrences of liquid centralization of Example 1 and Comparative Example 5 are shown in FIG. 1. When referring to FIG. 1, it was seen that Example 1 had significantly reduced liquid centralization of the pattern compared to Comparative Example 5, and patterns with a uniform thickness were able to be printed. Particularly, when referring to the first picture of FIG. 1, a downward direction is a printing direction in both top and bottom pictures, and whereas Example 1 of the present application had a clearly formed pattern, Comparative Example 5 had a blurred pattern itself and had liquid centralization seriously formed in the center of the pattern. In addition, in the second pictures, it was observed that Comparative Example 5 had a liquid centralization phenomenon expressed by dark colors on the right side of the pattern, and in the third pictures, it was also identified that Comparative Example 5 had a dark and high pattern formed on the pattern due to liquid centralization.

In addition, the results of observation on the evaporating rate of the ink compositions of Example 1 and Comparative Example 5 are shown in FIG. 2. When referring to FIG. 2, it was identified that Comparative Example 5 had a higher decrease in the weight compared to Example 1. This represents that the volatile solvent of Comparative Example 5 rapidly evaporated relatively increasing the water content ratio. When the water content ratio increases, surface energy increases causing pattern spreading.

In addition, the results of observation on the pattern spreading (liquid centralization) phenomenon of Example 1 and Comparative Example 5 depending on the printing time are shown in FIG. 3. When referring to FIG. 3, the pattern formed using the ink composition of Example 1 maintained its original form in process of time, whereas the pattern by Comparative Example 5 had serious pattern spreading.

Experimental results on the pattern spreading of Examples 1, 4 and 5 and Comparative Examples 4 and 5 are shown in FIG. 4. When referring to FIG. 4, it was identified that Examples 1, 4 and 5 had no occurrences of pattern spreading, whereas Comparative Examples 4 and 5 had pattern spreading occurring in the printing direction.

The invention claimed is:

1. An ink composition for a secondary battery separator, consisting essentially of:
a binder in an amount of 1 parts by weight to 20 parts by weight of the ink composition, wherein the binder is regenerated cellulose or a mixture of regenerated cellulose and any one selected from the group consisting of polyvinylidene fluoride, polyacrylate, an acryl-based copolymer, polyvinyl alcohol, carboxymethylcellulose (CMC), starch, hydroxypropylcellulose, polyvinyl pyrrolidone, tetrafluoroethylene, polyethylene, polypropylene, an ethyl ene-propyl ene-diene polymer (EPDM), a sulfonated EPDM, styrene-butadiene rubber, fluororubber, acrylic rubber, and mixtures thereof;
water in an amount of 5 parts by weight to 60 parts by weight of the ink composition;
a first solvent having a surface energy of 30 mN/m or less at 20° C. in an amount of 5 parts by weight to 80 parts by weight of the ink composition; and
a second solvent having a vapor pressure of 2 kPa or less at 20° C. in an amount of 5 parts by weight to 50 parts by weight, based on a total of 100 parts by weight of the ink composition,
wherein the first solvent and the second solvent are different from each other,
wherein the first solvent is at least one selected from the group consisting of ethanol and isopropyl alcohol, and
wherein the second solvent is at least one selected from the group consisting of ethanol, 2-butanol, 1-methoxy-2-propanol and 2-ethoxyethanol.

2. The ink composition for a secondary battery separator of claim 1, wherein the binder is in the form of an emulsion, and a diameter of the emulsion particles is 100 nm to 1000 nm.

3. A method for preparing a separator for a secondary battery comprising:
preparing a porous base; and
printing a coating solution on the porous base,
wherein the coating solution is formed using the ink composition of claim 1.

4. The method for preparing a separator for a secondary battery of claim 3, wherein the printing is carried out by gravure printing.

5. The method for preparing a separator for a secondary battery of claim 3, further comprising including inorganic particles on a surface of the porous base.

6. The method for preparing a separator for a secondary battery of claim 3, wherein the porous base is a sheet formed with any one or more polymers selected from the group consisting of high density polyethylene, low density polyethylene, linear low density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and mixtures thereof.

7. The method for preparing a separator for a secondary battery of claim 5, wherein the inorganic particles are any one or more selected from the group consisting of $BaTiO_3$, $Pb(Zr,Ti)O_3$ (PZT), $Pb_{1-x}La_xZr_{1-y}Ti_yO_3$ (PLZT) ($0<x<1$, $0<y<1$), $PB(Mg_{3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, $(LiAlTiP)_xO_y$-based glass ($0<x<4$, $0<y<13$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$) and mixtures thereof.

8. A separator for a secondary battery comprising:
a porous base; and
a coating solution on the porous base,
wherein the coating solution comprises the ink composition of claim 1.

9. The separator for a secondary battery of claim 8, further comprising inorganic particles on a surface of the porous base.

10. The separator for a secondary battery of claim 8, wherein the porous base is a sheet comprising any one or more polymers selected from the group consisting of high density polyethylene, low density polyethylene, linear low density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene and mixtures thereof.

11. The separator for a secondary battery of claim 9, wherein the inorganic particles are any one or more materials selected from the group consisting of $BaTiO_3$, $Pb(Zr,Ti)O_3$ (PZT), $Pb_{1-x}La_xZr_{1-y}Ti_yO_3$ (PLZT) ($0<x<1$, $0<y<1$), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, $(LiAlTiP)_xO_y$-based glass ($0<x<4$, $0<y<13$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$) and mixtures thereof.

12. An electrode assembly comprising:
the separator of claim 8;
a positive electrode; and
a negative electrode.

* * * * *

UNITED STATES PATENT AND TRADEMARK OFFICE
CERTIFICATE OF CORRECTION

PATENT NO. : 11,264,675 B2
APPLICATION NO. : 16/312183
DATED : March 1, 2022
INVENTOR(S) : Kun Seok Lee et al.

It is certified that error appears in the above-identified patent and that said Letters Patent is hereby corrected as shown below:

In the Claims

At Column 9, Lines 4-32, should read:
1. An ink composition for a secondary battery separator, consisting essentially of:
 a binder in an amount of 1 parts by weight to 20 parts by weight of the ink composition, wherein the binder is regenerated cellulose or a mixture of regenerated cellulose and any one selected from the group consisting of polyvinylidene fluoride, polyacrylate, an acryl-based copolymer, polyvinyl alcohol, carboxymethylcellulose (CMC), starch, hydroxypropylcellulose, polyvinyl pyrrolidone, tetrafluoroethylene, polyethylene, polypropylene, an ethylene-propylene-diene polymer (EPDM), a sulfonated EPDM, styrene-butadiene rubber, fluororubber, acrylic rubber, and mixtures thereof;
 water in an amount of 5 parts by weight to 60 parts by weight of the ink composition;
 a first solvent having a surface energy of 30 mN/m or less at 20° C. in an amount of 5 parts by weight to 80 parts by weight of the ink composition; and
 a second solvent having a vapor pressure of 2 kPa or less at 20° C. in an amount of 5 parts by weight to 50 parts by weight, based on a total of 100 parts by weight of the ink composition,
 wherein the first solvent and the second solvent are different from each other,
 wherein the first solvent is at least one selected from the group consisting of ethanol and isopropyl alcohol, and
 wherein the second solvent is at least one selected from the group consisting of ethanol, 2-butanol, 1-methoxy-2-propanol and 2-ethoxyethanol.

Signed and Sealed this
Twenty-seventh Day of September, 2022

Katherine Kelly Vidal
*Director of the United States Patent and Trademark Office*